US008867571B2

(12) United States Patent
Manne et al.

(10) Patent No.: US 8,867,571 B2
(45) Date of Patent: Oct. 21, 2014

(54) SYSTEMS, METHODS AND APPARATUS FOR TRANSMITTING DATA OVER A VOICE CHANNEL OF A WIRELESS TELEPHONE NETWORK

(75) Inventors: Gopi K. Manne, Littleton, CO (US); William Beals, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1285 days.

(21) Appl. No.: 12/058,935

(22) Filed: Mar. 31, 2008

(65) Prior Publication Data

US 2009/0249407 A1 Oct. 1, 2009

(51) Int. Cl.
*H04J 1/02* (2006.01)
*H04W 4/18* (2009.01)
*H04N 21/61* (2011.01)
*H04W 88/06* (2009.01)
*H04M 11/06* (2006.01)
*H04W 88/04* (2009.01)

(52) U.S. Cl.
CPC .............. *H04W 4/18* (2013.01); *H04W 88/06* (2013.01); *H04M 11/062* (2013.01); *H04N 21/6181* (2013.01); *H04W 88/04* (2013.01)
USPC ........ 370/494; 455/3.01; 455/3.02; 455/41.2; 455/41.3; 455/73; 455/88; 455/550.1; 455/557; 455/11.1; 370/352; 370/474; 370/493; 725/62; 725/68; 725/81; 725/106

(58) Field of Classification Search
CPC ..... H04W 88/06; H04W 4/18; H04M 11/062; H04M 11/066
USPC .......................... 725/62, 99, 106, 122, 68, 81; 455/3.01–3.06, 11.1, 12.1, 41.2, 41.3, 455/67.7, 406, 408, 418–420, 454, 509, 455/511, 550.1, 563, 68, 73, 88, 423, 557; 379/88.11, 88.12, 88.13; 370/352, 474, 370/493, 494
See application file for complete search history.

(56) References Cited

U.S. PATENT DOCUMENTS

| | | | |
|---|---|---|---|
| 4,852,086 A | 7/1989 | Eastmond et al. | ........... 370/69.1 |
| 5,675,371 A | 10/1997 | Barringer | |

(Continued)

FOREIGN PATENT DOCUMENTS

| | | |
|---|---|---|
| CN | 1452845 A | 10/2003 |
| JP | 7-250175 A | 9/1995 |

(Continued)

OTHER PUBLICATIONS

International Search Report for PCT application PCT/US2009/038017, mailed on Sep. 22, 2009.

(Continued)

*Primary Examiner* — Olumide T Ajibade Akonai
(74) *Attorney, Agent, or Firm* — Seed IP Law Group PLLC

(57) ABSTRACT

The various embodiments described herein generally provide apparatus, systems and methods which facilitate the transmission of data between a client device and a remote device over a wireless telephone network. More particularly, data from a client device is modulated into an audio signal and transmitted to a wireless telephone. The wireless telephone receives the audio signal and places a phone call to a remote device over a wireless telephone network. During the phone call, the wireless telephone transmits the audio signal across a voice channel of the wireless telephone network to the remote device. The remote device receives and decodes the audio signal to extract the transmitted data.

12 Claims, 9 Drawing Sheets

(56) References Cited

U.S. PATENT DOCUMENTS

| | | | |
|---|---|---|---|
| 5,794,144 A | 8/1998 | Comer et al. | |
| 5,974,094 A | 10/1999 | Fines | |
| 6,044,266 A | 3/2000 | Kato | |
| 6,151,491 A | 11/2000 | Farris et al. | |
| 6,167,253 A | 12/2000 | Farris et al. | |
| 6,493,338 B1* | 12/2002 | Preston et al. | 370/352 |
| 6,665,382 B2 | 12/2003 | Dunn | |
| 6,665,873 B1 | 12/2003 | Van Gestel et al. | 725/136 |
| 6,681,121 B1 | 1/2004 | Preston et al. | |
| 6,741,684 B2 | 5/2004 | Kaars | |
| 6,750,801 B2 | 6/2004 | Stefanik | 341/176 |
| 6,826,227 B1 | 11/2004 | Duval et al. | |
| 7,035,285 B2 | 4/2006 | Holloway et al. | |
| 7,058,356 B2* | 6/2006 | Slotznick | 455/3.05 |
| 7,061,885 B2 | 6/2006 | Kurtz | |
| 7,069,211 B2 | 6/2006 | Chiu et al. | |
| 7,117,001 B2 | 10/2006 | Lin et al. | 455/517 |
| 7,401,326 B1 | 7/2008 | Durham et al. | 717/139 |
| 7,627,406 B2* | 12/2009 | Wang et al. | 701/32.7 |
| 7,823,183 B2* | 10/2010 | Mickle et al. | 725/132 |
| 7,864,717 B2 | 1/2011 | Dorr | 370/267 |
| 8,260,285 B2* | 9/2012 | Anderton | 455/423 |
| 2001/0036828 A1 | 11/2001 | Butler et al. | 455/434 |
| 2002/0038210 A1 | 3/2002 | Yajima et al. | 704/230 |
| 2003/0033223 A1 | 2/2003 | Mizuno | 705/27 |
| 2003/0046083 A1 | 3/2003 | Devinney, Jr. et al. | 704/273 |
| 2003/0139933 A1 | 7/2003 | Kimmel | 704/275 |
| 2004/0073915 A1 | 4/2004 | Dureau | 725/9 |
| 2004/0085576 A1 | 5/2004 | Paz-Pujalt et al. | 358/1.15 |
| 2004/0181801 A1 | 9/2004 | Hagen et al. | 725/32 |
| 2004/0203374 A1 | 10/2004 | Zilliacus | |
| 2004/0225500 A1 | 11/2004 | Gardner et al. | |
| 2004/0250273 A1 | 12/2004 | Swix et al. | 725/25 |
| 2005/0148331 A1* | 7/2005 | Sharon et al. | 455/435.1 |
| 2005/0278648 A1 | 12/2005 | Taylor | 715/768 |
| 2006/0023852 A1 | 2/2006 | Casey | |
| 2006/0053436 A1 | 3/2006 | Allwein et al. | |
| 2006/0121909 A1* | 6/2006 | Welsh et al. | 455/450 |
| 2006/0154679 A1 | 7/2006 | Chang | 455/502 |
| 2006/0172766 A1* | 8/2006 | Kim et al. | 455/553.1 |
| 2006/0190966 A1 | 8/2006 | McKissick et al. | 725/61 |
| 2007/0118770 A1 | 5/2007 | Kahn et al. | 713/193 |
| 2007/0123286 A1* | 5/2007 | Mock et al. | 455/518 |
| 2007/0169144 A1 | 7/2007 | Chen et al. | 725/30 |
| 2007/0173231 A1 | 7/2007 | Fadell | |
| 2007/0245384 A1* | 10/2007 | Walter et al. | 725/62 |
| 2007/0250885 A1* | 10/2007 | Ohashi | 725/106 |
| 2008/0077950 A1* | 3/2008 | Burke et al. | 725/1 |
| 2008/0125098 A1* | 5/2008 | Bruce et al. | 455/414.1 |
| 2008/0134278 A1* | 6/2008 | Al-Karmi | 725/141 |
| 2008/0155636 A1 | 6/2008 | Cruz et al. | 725/131 |
| 2008/0196066 A1* | 8/2008 | Matz | 725/62 |
| 2009/0070796 A1* | 3/2009 | Stomakhin et al. | 725/1 |
| 2009/0070886 A1 | 3/2009 | Lecomte et al. | 726/27 |
| 2009/0111392 A1 | 4/2009 | Taylor | 455/88 |
| 2009/0232139 A1 | 9/2009 | Kelley | 370/392 |
| 2009/0296000 A1* | 12/2009 | Pal | 348/725 |
| 2010/0157973 A1 | 6/2010 | Bekiares et al. | 370/350 |

FOREIGN PATENT DOCUMENTS

| | | |
|---|---|---|
| JP | 11-68991 A | 3/1999 |
| JP | 2002-218083 | 8/2002 |
| JP | 2004-053763 A | 2/2004 |
| KR | 10-0726107 B1 | 6/2007 |
| WO | WO 01/08441 A | 2/2001 |
| WO | WO 01/99295 A | 12/2001 |
| WO | 2004/030260 A2 | 4/2004 |
| WO | WO 2004/039103 | 5/2004 |

OTHER PUBLICATIONS

European Standard, "Digital Video Broadcasting (DVB): Interaction channel through the Global System for Mobile communications (GSM)"; ETSI EN 301 195 V1.1.1, XX, XX, Feb. 1, 199, pp. 1-14.

Hall, Jaimie, PocketMail Composoer: E-mail Solution for the Road, RV Hometown, Nov./Dec. 2002, http://www.rvhometow.com/HTML/Articles/PocketMail.htm (access Jan. 28, 2008).

Manne et. al.,U.S. Appl. No. 12/058,947, filed Mar. 31, 2008.

Manne et. al.,U.S. Appl. No. 12/058,975, filed Mar. 31, 2008.

Office Action, for Korean Application No. 10-2010-7024017, dated Dec. 1, 2011, 4 pages.

Manne, Gopi K., "Systems, Methods and Apparatus for Transmitting Data Over a Voice Channel of a Wireless Telephone Network Using Multiple Frequency Shift-Keying Modulation," Office Action mailed Aug. 4, 2011, for U.S. Appl. No. 12/058,975, 17 pages.

Manne, Gopi K., "Systems, Methods and Apparatus for Transmitting Data Over a Voice Channel of a Telephone Network Using Linear Predictive Coding Based Modulation," Office Action mailed Oct. 28, 2011, for U.S. Appl. No. 12/058,947, 32 pages.

* cited by examiner

SYSTEMS, METHODS AND APPARATUS FOR TRANSMITTING DATA OVER A VOICE CHANNEL OF A WIRELESS TELEPHONE NETWORK

BACKGROUND

In pay television distribution systems, such as direct satellite broadcast systems, television receivers (also known as set-top boxes) often need to exchange data with a central data collection system. For example, a central data collection system often collects pay-per-view ordering information, health and diagnostics information and the like. Typically, a set-top box includes a modem that may communicate with a call processing system through an analog phone line in a home. The set-top box dials the call processing system periodically and exchanges data over the analog phone line. However, an increasing number of users no longer have wired lines at home and, thus it is a problem that set-top boxes are unable to communicate with the call processing system.

The use of wireless data channels has been proposed to cure the communication problem between the set-top box and a call processing system. A set-top box transmits data to the call processing center using a short-message-service (SMS) message. However, short-message-service (SMS) messages are limited to 160 characters. Thus, multiple short-message-service (SMS) messages are needed to communicate data between a set-top box and a call processing system. Most consumers pay for short-message-service (SMS) on a per message basis, and transmitting data over the short-message-service (SMS) system is cost prohibitive given the amount of data that is communicated between a set-top box and a call processing system. Because the set-top box may lack a back-channel, many features, such as pay-per-view movies, are unavailable to a large portion of subscribers.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the transmission of data between a client device and a remote device over a wireless telephone network. More particularly, data from a client device is modulated into an audio, signal and transmitted to a wireless telephone. The wireless telephone receives the audio signal and places a phone call through a wireless telephone network to a remote device. During the phone call, the wireless telephone transmits the audio signal across a voice channel of the wireless telephone network to the remote device. The remote device receives and decodes the audio signal to extract the transmitted data. In some embodiments, the client device and the remote device may transmit data bi-directionally. In short, the various embodiments described herein provide systems, methods and apparatus for exchanging data between a client device and a remote device over a voice channel of a wireless telephone network.

In at least one embodiment, data from the client device is modulated into an audio signal having characteristics of human speech. Many wireless telephone networks compress voice data for transmission. The typical voice signal is in the range of 300 Hz to 3400 Hz. If Pulse Code Modulation (PCM) is utilized at a sampling rate of 8000 samples/s, then 64 kb/s of bandwidth are required for transmitting a digital representation of the voice signal. However, the transmission rate of voice data across a wireless telephone network is typically 8 kb/s. To transmit voice data within the 8 kb/s bandwidth limit, a vocoder of a wireless telephone compresses the voice data prior to transmission across the wireless telephone network.

Compression techniques in wireless telephone networks are based on scientific models for voice generation. Voice signals may be reconstructed with little distortion compared with non-voice signals, such as music or analog modem signals. By modulating data signals into voice like audio signals prior to transmission through a wireless telephone network, the audio signal survives compression in the wireless telephone network and may be reconstructed at the remote device receiving the audio signal. After the audio signal is reconstructed at the remote device, the remote server may then extract the data represented by the audio signal. Techniques are described below for modulating data into an audio signal that has characteristics of human speech for transmission across a wireless telephone network or other type of telephone network that utilizes compression, such as a voice over internet protocol (VOIP) network.

Figure 1:
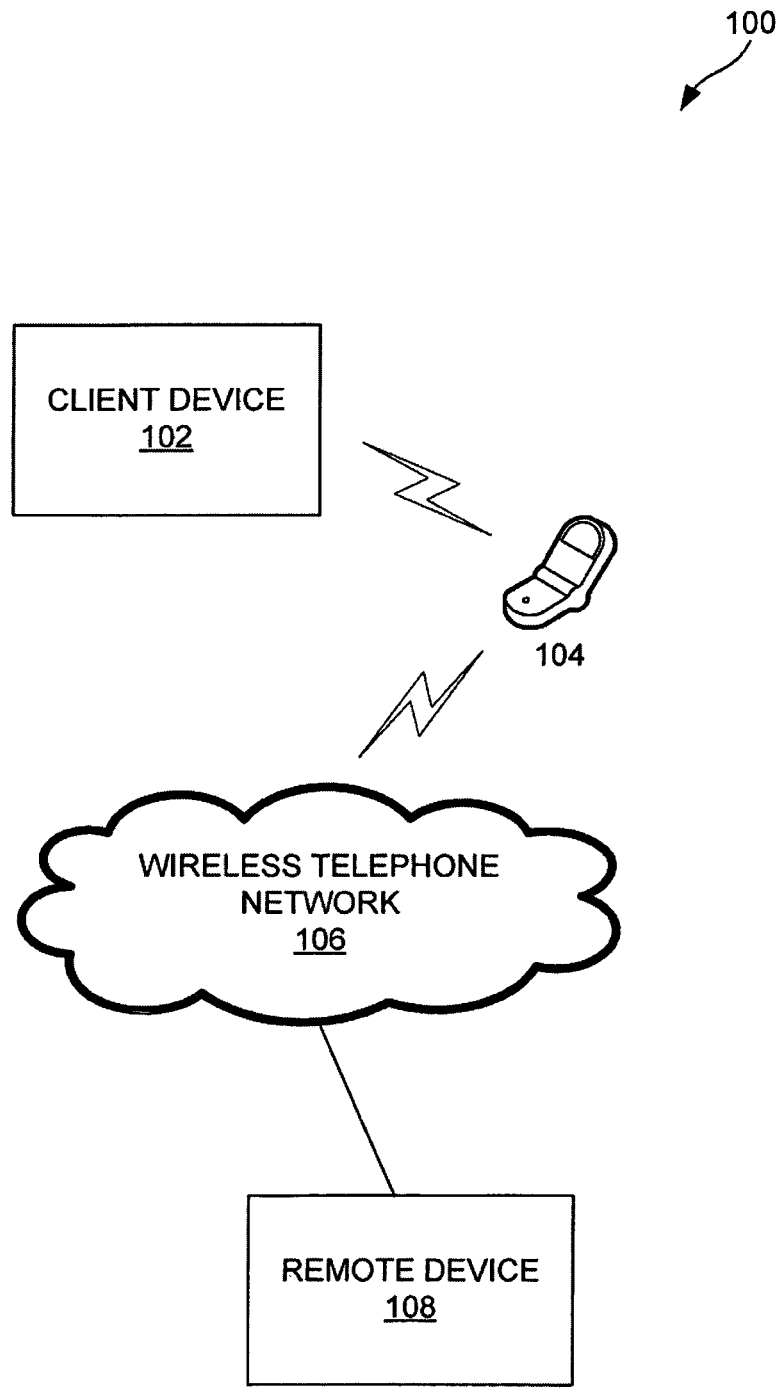
FIG. 1 illustrates an embodiment of a communication system.

FIG. 1 illustrates an embodiment of a communication system 100. More particularly, FIG. 1 illustrates a communication system 100 in which data may be wirelessly transmitted between a client device 102 and a remote device 108. The communication system 100 includes a client device 102, a wireless telephone 104, a wireless telephone network 106 and a remote device 108. Each of these components will be discussed in greater detail below.

The client device 102 maybe any type of device capable of generating or aggregating data for transmission to a remote device 108. The data to be received, processed, outputted and/or communicated may come in any of various forms including, but not limited to, audio, video, text, data, information, or otherwise. In at least one embodiment, the client device 102 is an entertainment device that is configured to receive presentation content from one or more content sources and to output the content for presentation on an associated presentation device. For example, the client device 102 maybe a satellite, cable, over-the-air or other type of television receiver that receives and demodulates television signals that are outputted for display on a display device (e.g., a television). As used herein, a television receiver may also be referred to as a set-top box, which is a television receiver that is located externally with respect to a display device. The aggregated data may include various types of data generated by a television receiver, including pay-per-view ordering information, demographic information, health and diagnostic information, account information and the like. It is also to be appreciated that the client device 102 may be integrated within a presentation device, such as a cable television receiver integrated with a television.

In various embodiments, the client device 102 includes sensing equipment for collecting data and other information for transmission to the remote device 108. For example, the client device 102 may collect weather related data for transmission to the remote device 108. In at least one embodiment, the client device 102 collects or aggregate operational and status information regarding itself or other systems or devices. For example, the client device 102 may determine that a particular part needs replaced or repaired and transmit this information to a remote device 108.

The communication system 100 includes a wireless telephone 104 that is communicatively coupled to a wireless telephone network 106. More particularly, the wireless telephone network 106 communicatively couples the wireless telephone 104 to the remote device 108. The wireless telephone network 106 may be any type of wireless network, such as a cellular network. The wireless telephone network 106 may include various network devices, including a base station and a mobile, switching center (MSC). In at least one embodiment, the wireless telephone network 106 may be communicatively coupled to the remote device 108 through a public switched telephone network (PSTN) (not shown in FIG. 1).

The wireless telephone 104 and the wireless telephone network 106 may communicate using any type of wireless protocol, including Code Division Multiple Access (CDMA), Time Division Multiple Access (TDMA), Global System for Mobile Communications (GSM) and the like. Further, the wireless telephone 104 and the wireless telephone network 106 may utilize any protocol of speech codec, including Enhanced Variable Rate Codec (EVRC), Selectable Mode Vocoder (SMV) Codec, Variable-Rate Multimode (VRM) Codec, 4GV -Enhanced Variable Rate Codec (EVRC) Wideband (WB), Adaptive Multi-Rate (AMR) Codec, GSM Full Rate (FR) Codec, GSM Enhanced Full Rate (EFR) Codec, Half-Rate (HR) Codec or Adaptive Multi-Rate Wide-Band (AMR WB) Codec.

The wireless telephone 104 and the client device 102 may be communicatively coupled through any type of wired or wireless connection. For example, the wireless telephone 104 may communicate with the client device 102 through a Bluetooth connection. In at least one embodiment, the client device 102 includes a universal serial bus (USB) connector or port to receive a Bluetooth dongle that is paired with the wireless telephone; 104. More particularly, the Bluetooth dongle may be configured as a wireless headset of the wireless telephone 104. Thus, the client device 102 may place a phone call to the remote device 108 through the wireless telephone 104 and exchange data during the phone call. In other embodiments, the wireless telephone 104 may be communicatively coupled to the client device 102 through a wired Connection, such as a universal serial bus (USES) cable, an analog headset jack or acoustically coupled to the client device 102. In at least one embodiment, the wireless telephone 104 is integrated within the client device 102.

The client device 102 selects data for transmission to the remote device 108 and modulates the data into an audio signal. As described below, the audio signal may be encoded to possess characteristics of human speech such that minimal distortion of the audio signal occurs during compression and transmission across the wireless telephone network 106. The client device 102 then transmits the audio signal to the wireless telephone; 104 and the wireless telephone 104 further transmits the audio signal to the wireless telephone network 106 for delivery to the remote device 108.

The remote device 108 may comprise any device or system that receives and/or transmits data from the client device 102 through the wireless telephone network 106. More particularly, the remote device 108 receives an audio signal from the client device 102 through the wireless telephone network 106 and demodulates the audio signal to extract the data transmitted by the client device 102. The remote device 108 may also be operable for transmitting data to the client device via the wireless telephone network 106. In at least one embodiment, the remote device 108 is a remote server that receives data from one or more client devices 102 and performs various processing and/or aggregation functions utilizing the received data. As described below, if the transmitted data was encoded by the client device 102 to have characteristics of human speech, then the remote device 108 may perform various processing techniques to extract the data represented by the audio signal and generate the original digital format representation of the data. The communication system 100 of FIG. 1 may include other components or devices not illustrated for the sake of brevity.

Figure 2:
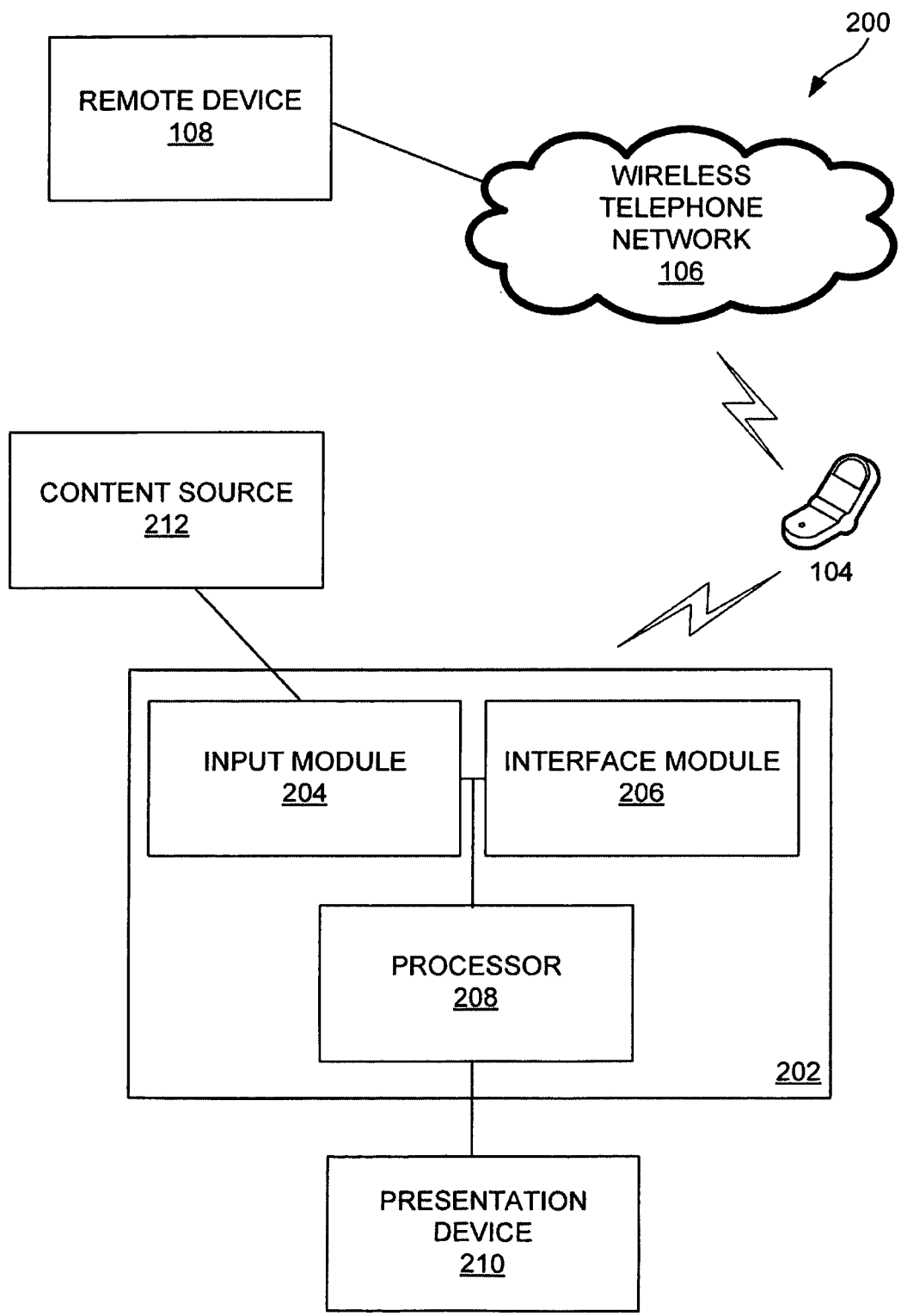
FIG. 2 illustrates another embodiment of a communication system.

FIG. 2 illustrates another embodiment of a communication system 200. More particularly, FIG. 2 illustrates the details of an entertainment device 202 that communicates data to a remote device 108 through a wireless telephone network 106. The communication system 200 includes a wireless telephone 104, a wireless telephone network 106, a remote device 108, an entertainment device 202, a presentation device 210 and a content source 212. The entertainment device 202 includes an input module 204, an interface module 206 and a processor 208. Each of these components will be discussed in greater detail below. The discussion of components common to FIG. 1 is omitted herein for the sake of brevity.

The content source 212 is operable for receiving, generating and communicating content to one or more entertainment devices 202. The content to be received, processed, outputted and/or communicated may come in any of various forms including, but not limited to, audio, video, data, information, or otherwise. In at least one embodiment, the content source 212 is operable for receiving various forms and types of content from other sources, aggregating the content and transmitting the content to the entertainment device 202. It is to be appreciated that the content source 212 may receive practically any form and/or type of information from one or more sources including streaming television programming, recorded audio or video, electronic programming guide data and the like. Exemplary content sources 212 include television distribution systems (e.g., over-the-air transmission facilities, cable television distribution head-ends and satellite television uplink centers), broadband or internet servers and the like.

The entertainment device 202 includes an input module 204 that receives content from the content source 212. The input module 204 may be communicatively coupled to the content source 212 through any desired combination of wired (e.g., cable and fiber) and/or wireless (e.g., satellite, microwave cellular or other type of radio frequency signal) communication mediums and any desired network topology (or topologies when multiple mediums are utilized). The input module 204 may comprise any type of input device, including wireless receivers, cable, satellite or over-the-air television tuners, Ethernet ports or other types of data connections and the like.

In various embodiments, the content source 212 may be a device located locally with respect to an entertainment device 202, such as a digital video recorder (DVR), digital video disk (DVD) player or other optical disk player, a local storage medium and the like. In at least one embodiment, a content source 212 may be integrated with an entertainment device 202. For example, the content source 212 may be a digital video recorder (DVR) integrated within a satellite television receiver.

The processor 208 is operable for controlling the operation of the entertainment device 202. In at least one embodiment, the processor 208 receives the content from the input module 204 and generates an outputstream for presentation on a presentation device 210. The processor 208 may further aggregate data regarding content, such as ordering information, demographic information, health and diagnostic information regarding the entertainment device 202 and the like.

The presentation device 210 is configured to receive the output stream from the entertainment device 202 and responsively present the output stream to a user (not shown). In at least one embodiment, the presentation device 210 is a display device configured to display content to a user. The presentation device 210 may receive a video stream in any format (e.g., analog or digital format), and present the video stream to a user. In other embodiments, the presentation device 210 is an audio playback system (e.g., a,stereo or MP3 player) configured to playback live or recorded audio content to a user. Likewise, the presentation device 210 may receive the; audio content in any format (e.g., analog or digital format) and reproduce the received audio content for a user.

The entertainment device 202 further includes an interface module 206 for communicating with a wireless telephone 104 to transmit data to a remote device 108 over the wireless telephone network 106. The interface module 206 may communicate with the wireless telephone 104 over any type of wired or wireless communication link. In at least one embodiment, the interface module 206 is a wireless transceiver that communicates with the wireless telephone 104. For example, the wireless transceiver may be integrated with the entertainment device 202. In another embodiment, the interface module 206 communicatively couples to an external wireless transceiver, such as a Bluetooth dongle. For example, the wireless transceiver may be configured as a wireless hands-free headset of the wireless telephone 104.

To transmit data to the remote device 108, the interface module 206 initiates a phone call to the remote device 108 through the wireless telephone 104. More particularly, the interface module 206 issues a command instructing the wireless telephone 104 to initiate a phone call to a phone number associated with the remote device 108. After the initiation of the phone call, the interface module 206 begins exchanging data with the remote device 108 through the wireless telephone network 106. In at least one embodiment, the interface module 206 identifies data for transmission, and modulates the data into an audio signal for transmission across a voice channel of the wireless telephone network 106. In some embodiments, the processor 208 may operate to identify and modulate data for transmission across the voice channel of the wireless telephone network 106. The interface module 206 then transmits the audio signal to the wireless telephone 104 and the wireless telephone 104 transmits the audio signal to the remote device 108 over a voice channel of the wireless telephone network 106 during the phone call.

Many wireless telephone networks utilize codecs optimized for voice data transfer. Thus, regular modem data and non-speech audio data may become distorted during transmission. As such, it may be desirable to encode data into an audio; signal mat has Characteristics similar to human speech, and thus is not distorted during compression and transmission across the wireless telephone network 106. In at least one embodiment, the data may be modulated using a linear predictive coding (LPC) based technique as described in further detail below. By modulating the data using linear predictive coding (LPC), the data is less likely to become distorted during compression and transmission across the wireless telephone network 106 because it is similar to human speech, which linear predictive coding (LPC) is designed to compress. In another embodiment, the data may be modulated using a multiple frequency-shift-keying (MFSK) based technique for transmission across the wireless telephone network 106. Similarly, data modulated using the multiple frequency-shift-keying (MFSK) technique will have frequencies within the range of human speech, and thus data experiences minimal distortion during compression or transmission across the wireless telephone network 106. After receiving the data, the remote device 108 analyzes the received audio signal to extract the transmitted data.

Those of ordinary skill in the art will appreciate that the various functional elements 202 through 208 shown as operable within the entertainment device 202 maybe combined into fewer discrete elements or may he broken up into a larger number of discrete functional elements as a matter of design choice. Thus, the particular functional decomposition suggested by FIG. 2 is intended merely as exemplary of One possible functional decomposition of elements within the entertainment device 202.

Figure 3:
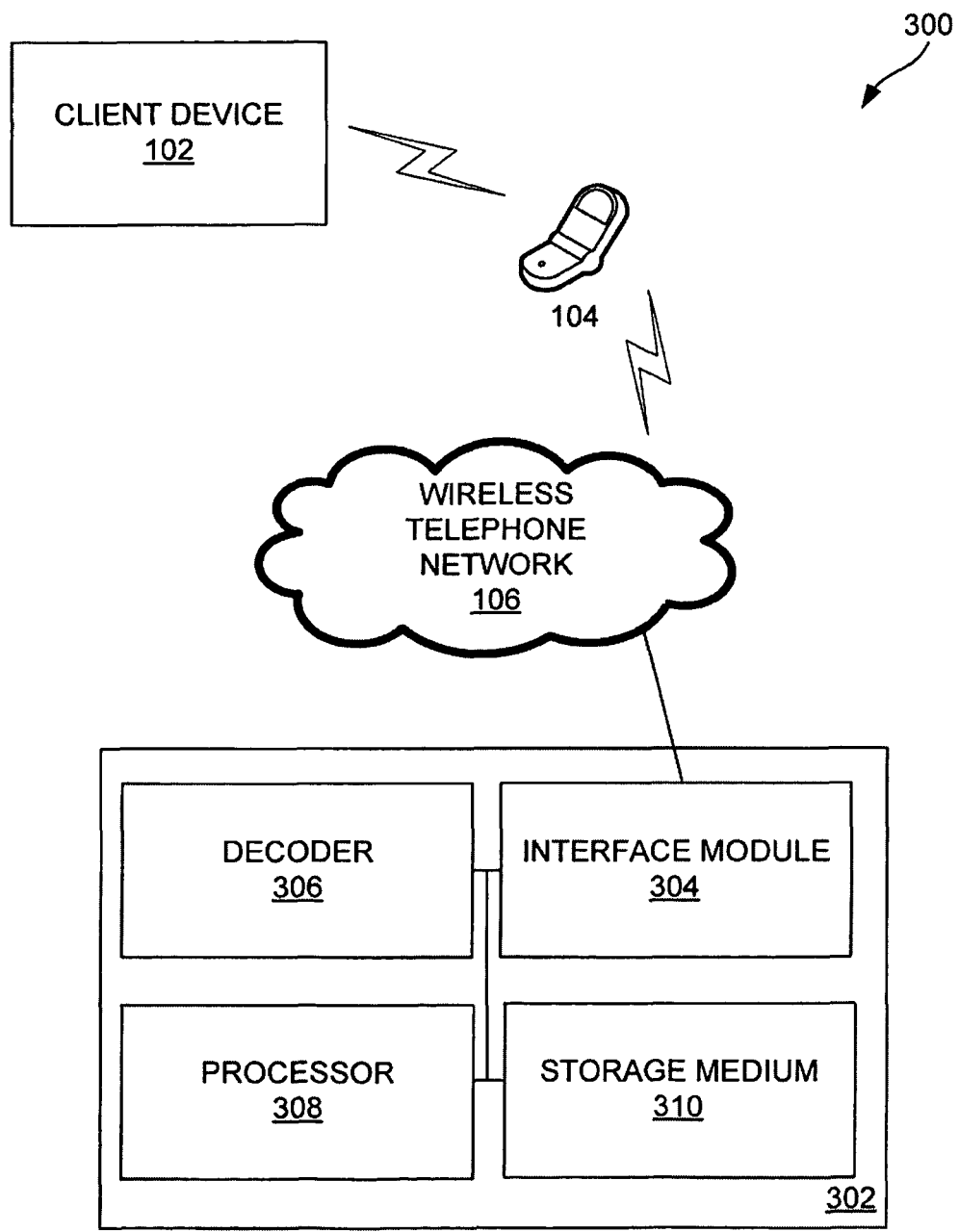
FIG. 3 illustrates another embodiment of a communication system.

FIG. 3 illustrates another embodiment of a communication system 300. More particularly, FIG. 3 illustrates the details of a call processing system 302 that receives data from a client device 102 over a wireless telephone network 106. The communication system 300 includes a client device 102, a wireless telephone 104, a wireless telephone network 106 and a call processing system 302. The call processing system 302 includes an interface module 304, a decoder 306, a processor 308 and a storage medium 310. Each of these components will be discussed in greater detail below. The discussion of components common to FIGS. 1-2 is omitted herein for the sake of brevity.

The call processing system 302 may be any type of device, system or combination of devices or systems that receives data from a remotely located client device 102 over a wireless telephone network 106. As described above, a wireless telephone 104 places a phone call to a call processing system 302 on behalf of a client device 102. An interface module 304 of the call processing system 302 is communicatively coupled to the wireless telephone network 106 to receive the phone call.

The interface module 304 may comprise any type of telephone connection for receiving the phone call. The interface module 304 may include a microphone or the like to capture the audio signal of the phone call for further processing by the call processing system 302. In at least one embodiment, the interface module is communicatively coupled to a public switched telephone network (PSTN) (not shown) in communication with the wireless telephone network 106. Thus, the interface module 304 may be a plain old telephone service (POTS) connection to the public switched telephone network (PSTN). In other embodiments, the interface module 304 may be a wireless telephone communicatively coupled to the wireless telephone network 106. The phone call includes data modulated into an audio signal. In at least one embodiment, the audio signal has characteristics of human speech. Further, the data represented by the audio signal may include,information regarding the client device 102.

A decoder 306 of the call processing system 302 receives the audio signal from the interface module 304 and parses the audio signal to extract the data and convert the data into a digital format. The decoder 306 may be any type of processing system operable to parse the audio signal to extract the digital data represented by the audio signal. As described in further detail below, if the data is encoded by the client device 102 using linear predictive code (LPC) based synthesis, then the decoding process may include linear predictive coding (LPC) based analysis to translate the audio signal into a digital representation of the data. Similarly, if the data is encoded by the client device based oh multiple frequency-shift-keying (MFSK), then the decoding process may include frequency selection analysis, such as Fast Fourier Transform (FFT) analysis, to decode the signal into bits of digital data.

The storage medium 310 of the call processing system 302 is configured to store any type of data utilized by the call processing system 302. The storage medium 310 may be any type of storage device, including hard drives, flash memory, tapes, optical storage devices and the like. Further, the storage medium 310 may include any number of storage devices that are physically and/or logically partitioned. In at least one embodiment, the storage medium 310 stores data regarding the client device 102. For example, the client device 102 may be a satellite television receiver and the data stored on the storage medium may include account information, pay-per-view ordering information and the like. In some embodiments, the storage medium 310 may store information utilized by the decoder 306 during decoding of the analog signal. For example, the storage medium may store a codebook utilized in linear predictive coding (LPC) based analysis or synthesis of an analog signal.

The processor 308 of the call processing system 302 is operable for controlling the operation of the call processing system 302. The processor 308 may be a single processing device or a plurality of processing devices that cooperatively operate to control the operation of the call processing system 302. In at least one embodiment, the processor 308 receives the digital format data from the decoder 306 and associates the digital format data with stored information regarding the client device 102. For example, if the data includes video ordering information regarding the client device 102, then the processor 308 may update account information regarding a user of the client device 102 based on the video ordering information. In Other embodiments, the data may include demographic information or health or diagnostic information regarding the client device 102 that is stored and utilized by the processor 308.

The processor 308 and/or related systems may be operable to perform further processing of the data received from the client device 102. For example, the processor 308 may generate a bill for a user of the client device 102 based on received video ordering information. If the received data includes health and diagnostic information, then the processor 308 may analyze the data to identify potential problems with the client device 102.

Those of ordinary skill in the art will appreciate that the various functional elements 304 through 310 shown as operable within the call processing system 302 may be combined into fewer discrete elements or may be broken up into a larger number of discrete functional elements as a matter of design choice. Thus, the particular functional decomposition suggested by FIG. 3 is intended merely as exemplary of one possible functional decomposition of elements within the call processing system 302.

Figure 4:
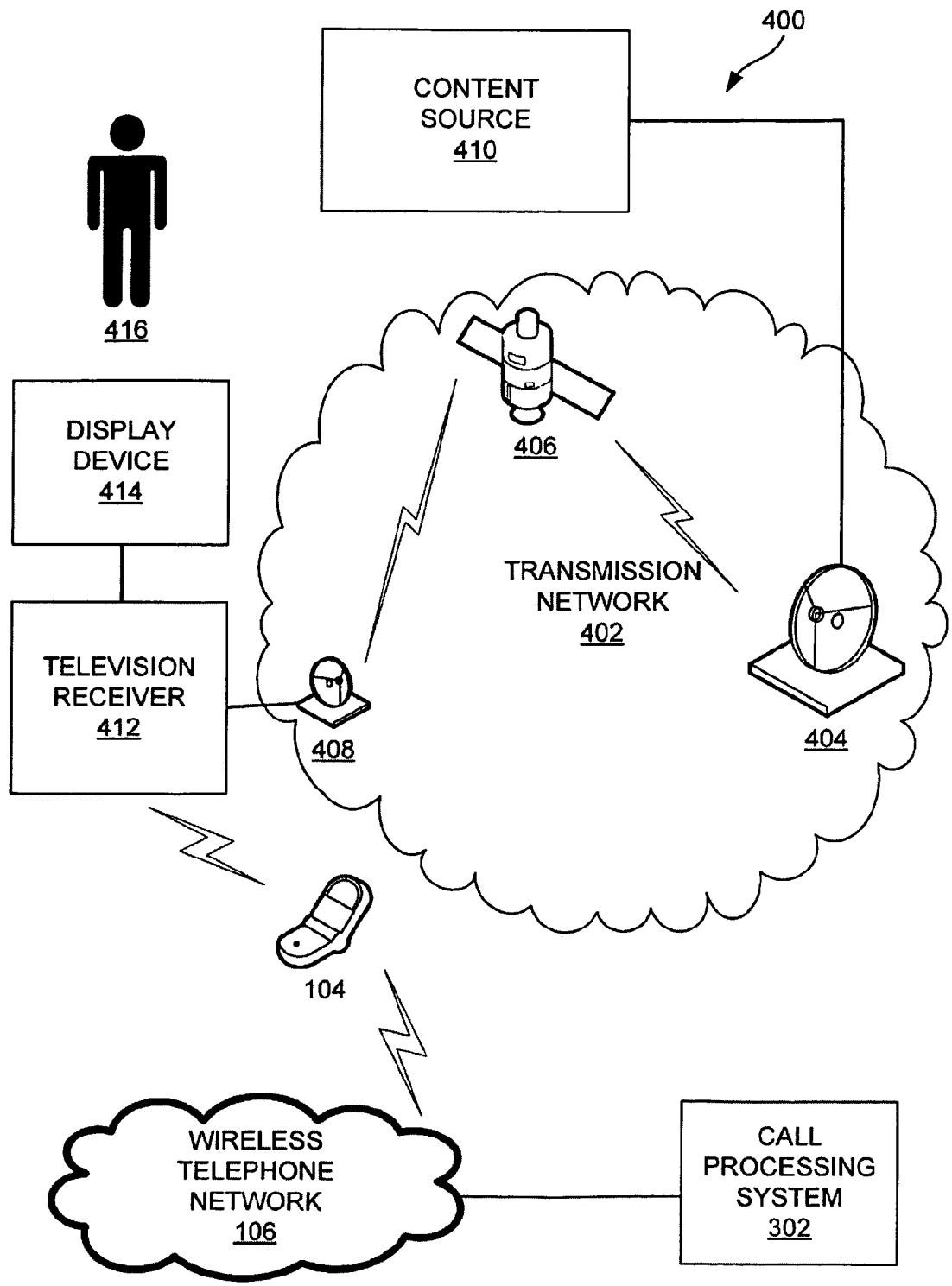
FIG. 4 illustrates an embodiment of a satellite broadcast system.

FIG. 4 illustrates an embodiment of a satellite broadcast system 400. The satellite broadcast system 400 includes a wireless telephone 104, a wireless telephone network 106, a call processing system 302, a transmission network 402, an uplink system 404, a satellite 406, a satellite antenna 408, a content source 410, a television receiver 412 and a display device 414. Each of these components will be discussed in greater detail below. Discussion of components common to FIGS. 1-3 is omitted for the sake of brevity.

Satellite broadcast system 400 includes a content source 410 in signal communication with an uplink system 404 of a transmission network 402. The content source 410 provides the uplink system 404 with television programs that are transmitted to a television receiver 412. Television programs may be broadcast by the transmission network 402 to the television receiver 412. A television program may be embodied as MPEG-2, MPEG-4 or other digital video signals, analog or baseband signals, and/or other video data on a channel of the satellite broadcast system 400.

Satellite broadcast system 400 further comprises a satellite 406 in signal communication with the uplink, system 404. The satellite 406 broadcasts television programs received from the uplink system 404. The satellite broadcast system 400 further comprises a satellite antenna 408 for receiving the television program broadcast from the satellite 406. The satellite antenna 408 is in signal communication with the television receiver 412, and provides the television receiver 412 with the television program. The broadcast television program content is received by the television receiver 412 and outputted for presentation on the display device 414.

The user 416 may desire to view a pay-per-view movie on the display device 414. The user 416 uses a remote control (not shown) to order the pay-per-view movie through the television receiver 412. Responsive to the order, the television receiver 412 communicates with the call processing system 302 to authenticate the order and permit the user to view the pay-per-view movie. The television receiver 412 places a call to the call processing system 302 through the wireless telephone 104. The television receiver 412 modulates the ordering information into an audio signal and transmits the audio signal to the wireless telephone 104. The wireless telephone 104 then transmits the audio signal to the call processing system over the wireless telephone network 106. The call processing system 302 processes the audio signal to extract the data and complete the order. After verifying the order, the call processing system 302 transmits authentication information to the television receiver 412. The authentication information may be transmitted to the television receiver through the transmission network 402 or through the wireless telephone network 106. For example, the call processing system 302 may modulate the authentication information into a second audio signal that is transmitted to the wireless telephone 104 through the wireless telephone network 106. The wireless telephone 104 then transmits the second audio signal to the television receiver 412, and the television receiver 412 demodulates the second audio signal to extract the authentication information. After extracting the authentication information, the; television receiver 412 allows the user 416 access to the pay-per-view movie.

Figure 5:
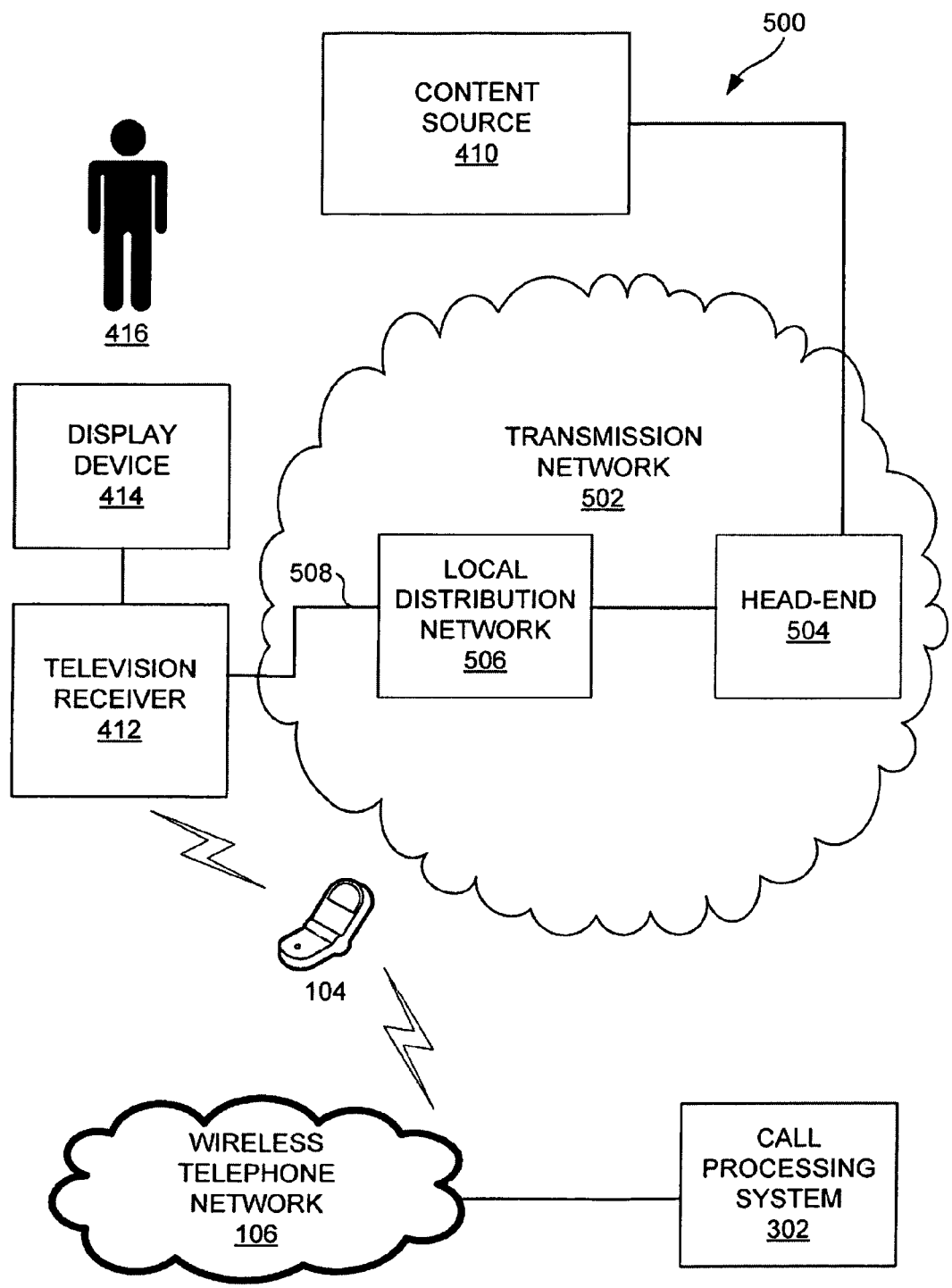
FIG. 5 illustrates an embodiment of a cable television distribution system.

The transmission network 402 (see FIG. 4) may alternatively be embodied as a cable television distribution system or an over-the-air television distribution system. FIG. 5 illustrates an embodiment of a cable television distribution system 500. The cable television distribution system 500 includes a wireless telephone 104, a wireless telephone network 106, a call processing system 302, a television receiver 412, a display device 414, a transmission network 502, ahead-end 504, a local distribution network 506 and a drop 508. Each of these components will be discussed in greater detail below. Discussion of components common to FIGS. 1-4 is omitted for the sake of brevity.

Cable television distribution system 500 comprises a head-end 504 in signal communication with the content source 410. The content source 410 provides the head-end 504 with television programs that are transmitted to the television receiver 412. Television programs may be broadcast by the transmission network 502, or may be pushed to the television receiver 412 responsive to a request by the user 106 (e.g., on-demand-viewing).

Cable television distribution system 500 further comprises a local distribution network 506 in signal communication with the head-end 504. The local distribution network 506 is operable for receiving content from the head-end 504 and distributing the content to individual television receivers 412. The television receiver 412 is in signal communication with the local distribution network 506 using a drop 508 from a feeder line of the local distribution network 506. The local distribution network 506 may provide content as a broadcast to the television receiver 412, or may provide content to a specific addressable television receiver 412 using a broadband connection. Responsive to receiving the content, the television receiver 412 outputs the content for presentation by the display device 414.

As described in FIG. 4, the user 414 may desire to purchase a pay-per-view movie available through the television receiver 412. The television receiver 412 generates ordering information that is transmitted to the call processing system 302 via a voice channel of the wireless telephone network 106. The television receiver 412 may then receive authentication information from the call processing system 302 responsive to the ordering information and allow the user 416 access to the pay-per-view movie.

Figure 6:
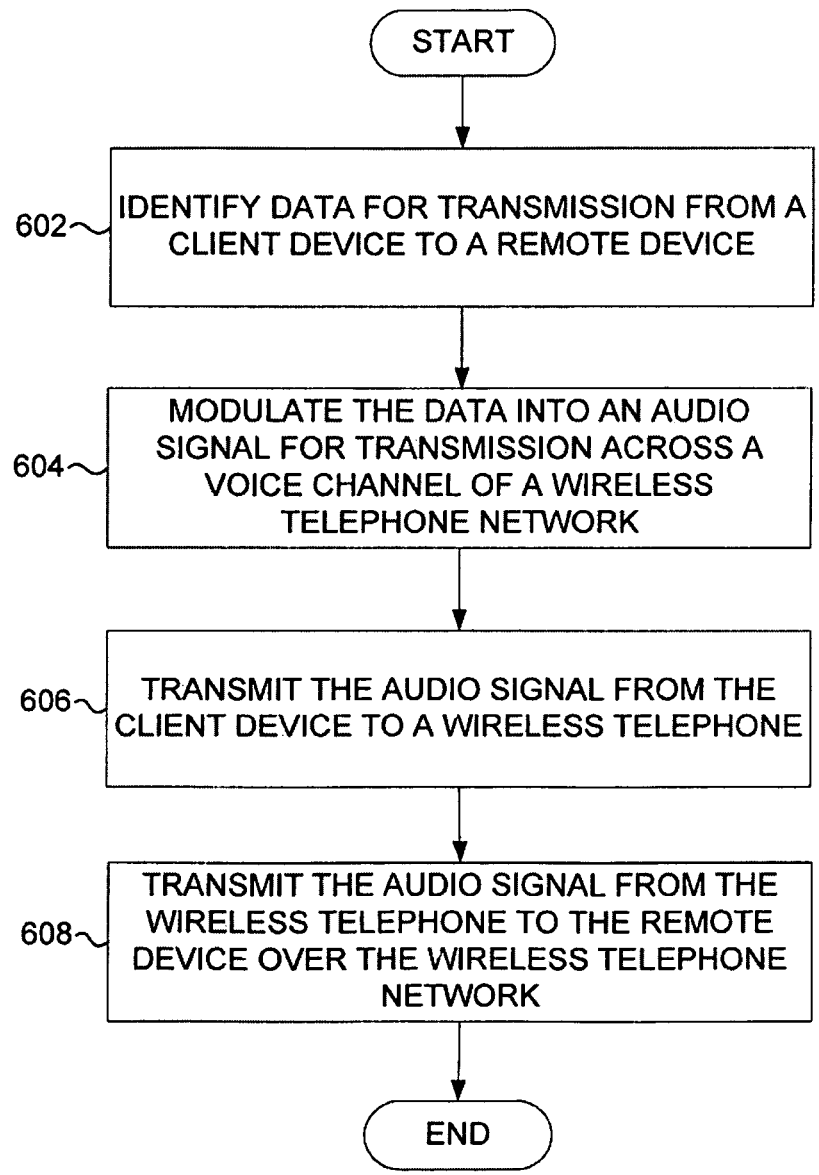
FIG. 6 illustrates an embodiment of a process for transmitting data from a client device to a remote device over a wireless telephone network.

FIG. 6 illustrates an embodiment of a process for transmitting data from a client device to a remote device over a wireless telephone network. The process of FIG. 6 will be discussed in reference to transmitting data between a satellite television receiver and a call processing system. However, it is to be appreciated that the operations of FIG. 6 may be applied to transmitting any type of data between any type of client device and a remote device (or a remote server). In other words, the process of FIG. 6 may be applied to any type of client device that needs to call home to transmit data or to transmit data to a remotely located device. Further, the operations of FIG. 6 may be applied to transfer data bi-directionally between a client device and a remote device. The process of FIG. 6 may include other operations not illustrated for the sake of brevity.

The process includes identifying data for transmission from a client device to a remote device (operation 602). The identified data may be generated by the client device or provided by external devices. Identifying the data for transmission may be done according to a pre-defined schedule or may be done responsive to user input or other events. For example, a satellite television receiver may aggregate pay-per-view ordering information and health and diagnostic information that is transmitted back to a call processing system every seven days.

In another embodiment, video ordering information may be identified for transmission to a call processing system responsive to user input. For example, a user may request access to a pay-per-view movie through the satellite television receiver and the satellite receiver may transmit data to a call processing system to authenticate the order. In another embodiment, the satellite receiver (or any type of device) may identify data for transmission to a call processing system (or another type of remote device or server) responsive to a system or component failure or error. For example, the satellite television receiver may include a hard drive for storing recorded video. Further, the satellite television receiver may determine that the hard drive has failed and generate a notification message for transmission to a call processing system. Thus, the satellite television provider is quickly notified of the equipment failure and may initiate delivery of replacement equipment to the user immediately in order to minimize the inconvenience to the user.

The process further includes modulating data from the client device into an audio signal for transmission across a voice, channel of a wireless telephone network (operation 604). In at least one embodiment, the modulation operation includes selecting at least a portion of the data for transmission and identifying an appropriate frequency or frequencies of ah audio signal to represent the selected data. In some embodiments, the data may be modulated using frequency shift-keying (FSK) to generate a regular modem audio signal. However, as described above, some mobile telephone networks compress audio signals during transmission. Thus, a regular modem audio signal may become distorted during transmission across the wireless telephone network.

As described below, modulation techniques may be employed that generate an audio signal that matches the characteristics of human speech. Most wireless telephone networks are capable of transmitting human speech in compressed form with little distortion. If the modulated audio signal representing the data matches the characteristics of human speech, then minimal distortion of the audio signal occurs during compression and transmission over the wireless telephone network. Code excited linear prediction (CELP) is a technique described below for encoding digital data into audio signals that match the characteristics of human speech in order to minimize distortion of the signal during compression and transmission across a wireless telephone network. Multiple frequency shift-keying (MFSK) is another technique described below that encodes digital data into an audio signal that corresponds with the frequency range of human speech to also minimize distortion of the signal during compression and transmission across a wireless telephone network.

The process further includes transmitting the audio signal from the client device to a wireless telephone (operation 606). The client device and the wireless telephone may be communicatively coupled over any combination of wireless and/or wired connections. For example, a Bluetooth dongle attached to the client device may transmit data to the wireless telephone in a wireless handsfree configuration. In at least one embodiment, the client device transmits a command to the wireless telephone instructing the wireless telephone to place a phone call to the remote device. After the phone call is established, the client device begins transmitting the audio signal to the wireless telephone for transmission across the wireless telephone network.

The process further includes transmitting, the analog signal from the wireless telephone to, a remote device over the wireless telephone network (operation 608). The remote device then performs processing techniques to extract the data represented by the transmitted audio signal. In at least one embodiment, a vocoder of the wireless telephone compresses the audio signal for transmission across the wireless telephone network.

While the process of FIG. 6 has been described in reference to transmitting data from a client device to a remote device or server, it is to be appreciated that data may be transmitted in either direction. For example, the remote device may place a call to the wireless telephone and transmit data to the wireless telephone over the wireless telephone network. The wireless telephone may then transmit the data to the client device. In at least one embodiment, the wireless telephone may receive data from the remote device or server. When the wireless telephone comes within wireless range of the client device (or is coupled to the client device over a wired connection), then the wireless telephone may transmit the data to the client device.

In some embodiments, data may be transmitted bi-directionally between the client device and the remote device over the voice channel during the phone call. For example, the client device may initially transmit data to the remote device. Once the data transmission is complete, the remote device may utilize the voice channel to transmit second data to the client device over the voice channel. Thus, both the client device and the remote device may concurrently operate to modulate and demodulate two sets of audio signals to transmit two sets of data therebetween.

Audio compression in wireless telephone networks maybe based on models for voice generation. One technique, entitled linear predictive coding (LPC), is often used to encode and compress speech data for transmission across a wireless telephone network. The linear predictive coding (LPC) voice compression technique assumes that speech is produced by a buzzer at the end of a tube (voice sounds), with hissing and popping sounds occasionally added to the speech. The glottis, the space between vocal cords, produces the buzz in speech, which is characterized by an intensity (loudness) and a frequency (pitch). The vocal tract of the throat and mouth form a tube, which is characterized by its resonance (filter coefficients or linear predictive coding (LPC) coefficients), which are called formants.

In linear predictive coding (LPC), speech is analyzed to estimate the formants. The effects of the formants are removed from the speech signal. An estimate is made regarding the intensity and frequency of the remaining buzz. The process of removing the formants is known as inverse filtering and the remaining signal after the subtraction of the filter modeled signal is known as the residue.

The numbers mat describe the intensity and frequency of the buzz, the formants and the residue signal may be used to synthesize an audio signal for transmission by a wireless telephone across the wireless telephone network. At the receiving end, linear predictive coding (LPC) analyzes the speech signal by reversing the process. The buzz parameters and the residue are utilized to create a source signal, and the formants are used to create a filter that represents the tube. The source signal is run through the filter to reproduce the speech. Thus, a listener on the other end of a conversation hears a reproduction of the original speech of the speaker.

Figure 7:
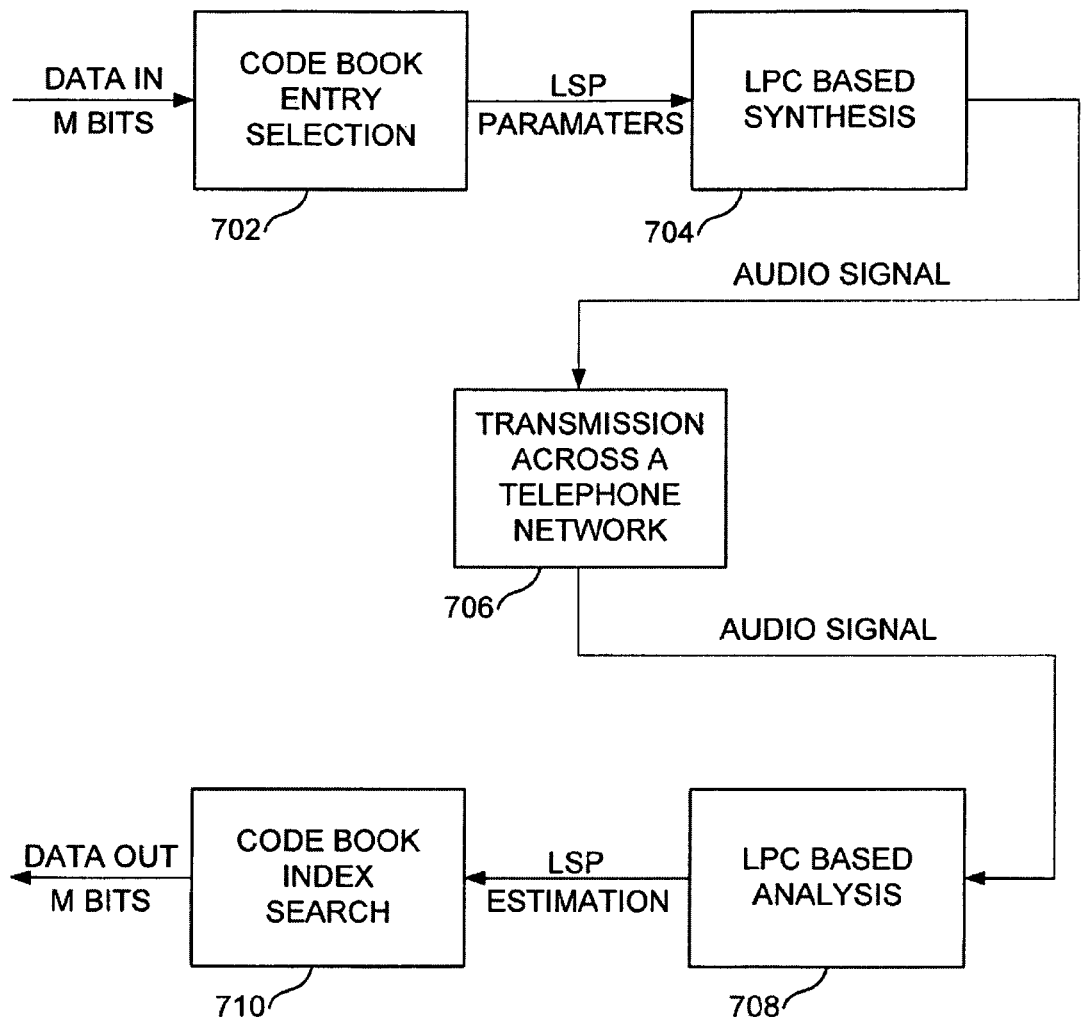
FIG. 7 illustrates an embodiment of a process for transmitting data between a client device and a remote device using linear predictive code (LPC) based modulation.

These techniques may be applied to encode data for transmission across a wireless telephone network to a remote device with minimal distortion of the audio signal, and thus the transmitted data. FIG. 7 illustrates an embodiment of a process for transmitting data between a client device and a remote device using linear predictive code (LPC) based modulation. The process of FIG. 7 may be utilized to encode data for transmission between any two devices over any type of voice telephone network. The operations of FIG. 7 are not all-inclusive, and may include other operations not illustrated for the sake of brevity.

Input data of length M bits is received for transmission from the client device to the remote device through a telephone network. If the total data to be transmitted is greater than Mbits, then the input data may be divided into a plurality of segments, each segment having a length of M bits. The client device stores a codebook of line-spectral pair (LSP) parameters. Each value of line-spectral pair (LSP) parameters corresponds with a particular value of input data having a length of M bits and each value of line-spectral pair (LSP) parameters is distinct from the other combinations of line-spectral pair (LSP) parameters in the codebook. In at least one embodiment, the codebook includes an entry for every bit pattern combination for M bits of input data, e.g., $2^M$ entries in the codebook. For example, if M is 10 bits, then the codebook may include 1024 total entries of line-spectral pair (LSP) parameters. While M is described as 10 bits, it is to be appreciated that M may include any number of bits depending on desired design criteria. Based on the input data, a particular entry from the codebook may be selected and converted into an audio signal for transmission across a telephone network.

The process includes selecting a vector in the codebook for an entry corresponding to the input data (operation 702). From the selected vector in the codebook, the line-spectral pair (LSP) parameters corresponding with the entry are retrieved for utilization in generating an audio signal having characteristics of human speech. The frequencies for the line-spectral pair (LSP) coding are extracted using linear predictive coding (LPC) (coefficients). For example, if the input data is the bit pattern '0100100101', then the line-spectral pair (LSP) parameters may be $\omega_k$, where $\omega_k$ is a set of 10 line-spectral pair (LSP) coefficients representing a sound corresponding with the data. While 10 line-spectral pair (LSP) coefficients are described herein, it is to be appreciated that any number of line-spectral pair (LSP) parameters, such as 12, may be utilized depending on desired design criteria. It is to be appreciated that the number of LSP parameters do not need to correspond with the number of bits transmitted by the representative signal. For example, 10 LSP parameters may he utilized to transmit 28 bits of data in some embodiments.

The process further includes performing a linear predictive code (LPC) based synthesis using the line-spectral pair (LSP) parameters to generate an audio signal (operation 704). Because the audio signal is generated from the line-spectral pair (LSP) parameters, the audio signal has characteristics of human speech and minimal or no distortion of the audio signal occurs during transmission of the audio signal. In other words, the audio signal representing the input data is a speech like signal. While the audio signal may not be an actual spoken word, it is speech like since the characteristics of the sound are similar to the characteristics of synthesized spoken words. The linear predictive coding (LPC) based synthesis and codebook selection may be performed by a client device, such as a satellite receiver set-top box or by a wireless device communicatively coupled to a wireless telephone network. In at least one embodiment, the linear predictive coding (LPC) based synthesis and codebook selection are performed by an intermediate device between the client device and the wireless telephone, such as a synthesizer.

The process further includes transmitting the audio signal through a voice channel of a telephone network to a remote device (operation 706). In at least One embodiment, the telephone network is at least partially a wireless telephone network, such as a cellular, microwave or satellite network. For example, the client device may be communicatively coupled to a wireless base station of the telephone network through an integrated or external wireless telephone. In another embodiment, the client device is communicatively coupled to a traditional analog landline telephone network and the remote device is communicatively coupled to the telephone network through a wireless base station of the telephone network. In some embodiments, the remote device and the client device may be communicatively coupled through a voice over internet protocol (VOIP.) telephone network.

In at least one embodiment, a client device includes an integrated wireless transceiver for communicating with a wireless telephone network. In other words, the client device includes an integrated wireless telephone for transmitting the audio signal across the wireless telephone network to the remote device. In other embodiments, the client device transmits the synthesized audio signal to a wireless telephone over a wired or wireless connection, and the wireless telephone transmits the audio signal to the remote device over a, voice channel of the wireless telephone network.

When the remote device receives the audio signal from the telephone network, the remote device performs a linear predictive code (LPC) based analysis to identify the line-spectral pair (LSP) parameters for the received audio signal (operation 708). To identify the line-spectral pair (LSP) parameters for the received audio signal, a decoder of the remote device estimates the line-spectral pair (LSP) coefficients of the received signal using a similar linear predictive code (LPC) based algorithm used to encode the audio signal at the client device.

However, the linear predictive coding (LPC) coefficients may not be sufficient for signal reconstruction. Thus, pitch and-gain parameters may be estimated from the residual. The residual is also known as the error, and may be used to reconstruct the original audio signal. Thus, a linear predictive code (LPC) based analysis is performed on the input signal to identify line-spectral pair (LSP) parameters. Operation 708 results in line-spectral pair (LSP) estimated coefficients that may be used to extract a value of the transmitted data.

The process further includes searching a codebook using the estimated line-spectral pair (LSP) coefficients to identify an index corresponding with the estimated line-spectral pair (LSP) coefficients (operation 710). In at least one embodiment, a search of the codebook may be performed based on the minimum mean square error of the line-spectral pair (LSP) coefficients to locate an index closest in value to the estimated line-spectral pair (LSP) coefficients. The position of the identified entry in the codebook corresponds to the bit sequence transmitted by the client device. In at least one embodiment, the input data is gray coded for transmission in operation 702 arid inverse gray coded in operation 710 in order to extract the original value of the input data at the remote device.

As described above, in at least One embodiment, a codebook utilized for transmitting M bits of data may include $2^M$ entries. Thus, for transmitting M bits of data, $2^M$ entries maybe utilized. Due to storage limitations, storing $2^M$ separate entries in a client device may be infeasible in certain situations. Take for example the case where 28 bits are utilized to code 10 line-spectral pair (LSP) coefficients for each of the $2^{28}$ entries in the codebook, resulting in the storage of $320 \times 2^{28}$ bits. This storage requirement may be too large for some types of client devices with limited storage capacity. However, the codebook and the coefficients may be divided into multiple groups to reduce the amount of storage needed for the codebook Take for example 10 coefficients ($\omega_k$) for a single entry in the codebook: The coefficients may be divided into 4 groups ($\omega_1$, $\omega_2$), ($\omega_3$, $\omega_4$), ($\omega_5$, $\omega_6$, $\omega_7$) and ($\omega_8$, $\omega_9$, $\omega_{10}$). Because portions of many coefficient combinations are duplicated, the division of the codebook into smaller components eliminates the storage of many of these duplicate combinations for portions of line-spectral pair (LSP) coefficients. One codebook may be utilized for each group, as illustrated in Table #1 below:

|  | Codebook number | | | |
| --- | --- | --- | --- | --- |
|  | 1 | 2 | 3 | 4 |
| # of filter coefficients (LSP) | 2 | 2 | 3 | 3 |
| # of bits for each codebook (28) | 6 | 6 | 9 | 7 |
| Number of Entries in the codebook | 64 | 64 | 512 | 128 |

As illustrated above, the divided codebooks may be stored in 6,28869632 bits $(64 \times 2 + 64 \times 2 + 512 \times 3 + 128 \times 3) \times 32$. This results in a significant storage reduction for both the client device and the remote device, which each store a copy of the codebook. During encoding, the client device segments input data into the four groups and retrieves the line-spectral pair (LSP) parameters corresponding with the input data from each of the codebooks. Likewise, the remote device may segment the received signal to utilize the same type of segmented codebook implementation.

For example, the input data may be the bit pattern '0100100101'. To retrieve the line-spectral pair (LSP) parameters corresponding with this particular input data, the bit pattern is divided into the groups '01', '00', '100' and '101'. The client device retrieves the line-spectral pair (LSP) coefficients ($\omega_1$, $\omega_2$) corresponding with the value '01' from the first codebook. Likewise, the client device retrieves the line-spectral pair (LSP) coefficients ($\omega_3$, $\omega_4$) for the value '00' from codebook 2, the line-spectral pair (LSP) coefficients ($\omega_5$, $\omega_6$, $\omega_7$) for the value '100' from codebook 3 and the line-spectral pair (LSP) coefficients ($\omega_8$, $\omega_9$, $\omega_{10}$) for the value '101' from codebook 4. The retrieved coefficients are combined to form the line-spectral pair (LSP) coefficients $\omega_k$ for the bit pattern '0100100101'.

In at least one embodiment the codebook may be pre-configured on the client device and/or the remote device at the time of manufacture or may be stored on either device during a subsequent software and/or firmware update. For example, a satellite television receiver may receive a codebook in a download from the satellite uplink center during a periodic update. In at least one embodiment, the client device transmits the audio signal to a wireless telephone through a Bluetooth dongle. Thus, the codebook may be stored within the Bluetooth, dongle and utilized by the client device during encoding of the audio signal.

In the described example, 10 line-spectral pair (LSP) coefficients allow for the transmission of 10 bits during transmission of a single symbol. A vocoder of a wireless telephone typically divides a voice conversation into a series of frames for transmission from the wireless telephone to a base station of a wireless telephone network. Typically, speech signals are split into 20 ms frames and the wireless telephone transmits 50 frames per second to the base station. Each encoded audio signal representing a particular 10 bit pattern may be transmitted as a single packet or symbol that corresponds to the size or length of the frames utilized by the wireless telephone network. This minimizes or eliminates the potential interference of two distinct audio signals transmitted by the client device over the wireless telephone network during successive time intervals. With a codebook of 1024 entries, corresponding to 10 bits/frame, a data transfer rate of 500 bits per second may be achieved.

To further increase the data transfer rate, in at least one embodiment, the gain and period parameters in the linear predictive coding (LPC) can be quantized and some bits can be assigned to these parameters. This technique allows for an increase in the data transmission rate. For example, 1 bit may be assigned to the adaptive codebook (ACB) gain and 1 bit assigned to the fixed codebook (FCB) gain. In at least one embodiment, the audio signal is transmitted at either a maximum amplitude or a middle value (e.g., 50% of the maximum amplitude). This allows for the transmission of 12 bits per frame rather than the 10 bits per frame when 10 line-spectral pair (LSP) coefficients are utilized. Thus, the data transfer rate increases from 500 bits per second to 600 bits per second. It is to be appreciated that Other techniques may also be utilized to increase the data transmission rate.

Multiple frequency shift-keying (MFSK) (or M-ary frequency shift-keying (FSK) is another technique that may be utilized to transmit data from a client device to a remote device over a telephone network. In frequency shift-keying (FSK), two frequencies are used to transmit 1 bit of data. A first frequency $f_1$ represents a digital '0' and a second frequency $f_2$ represents a digital '1'. In multiple frequency shift-keying (MFSK), more man two frequencies are used to transmit data, with each frequency corresponding to a particular multiple bit (M) value of data. For example, four frequencies may be utilized to transfer various combinations of 2 bit values of data. A first frequency $f_1$ represents the digital value '00', a second frequency $f_2$ represents the digital value '01', a third frequency $f_2$ represents the digital value '10' and a fourth frequency $f_4$ represents the digital value '11'.

Figure 8:
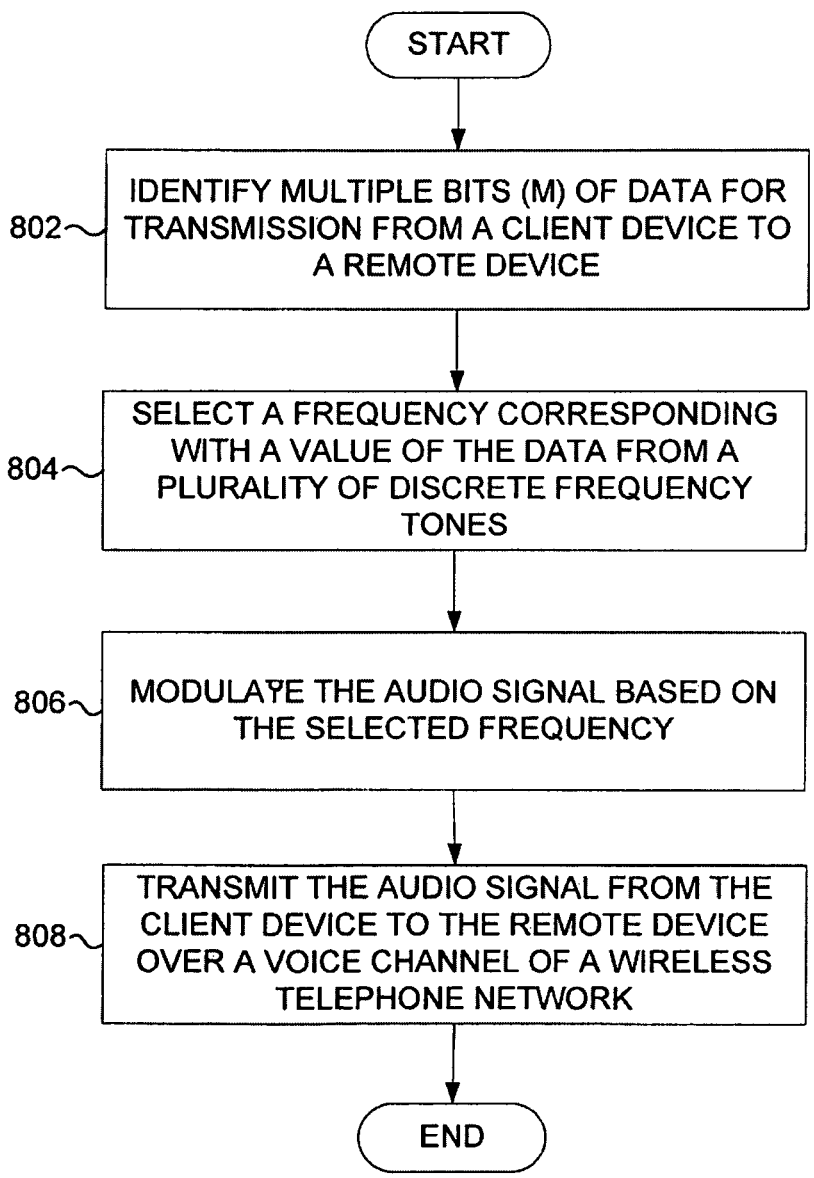
FIG. 8 illustrates an embodiment of a process for transmitting data between a client device and a remote device using M-ary frequency shift-key (FSK) based modulation.

FIG. 8 illustrates an embodiment of a process for transmitting data between a client device and a remote device using M-ary frequency shift-key (FSK) based encoding. The process of FIG. 8 may be utilized to encode data for transmission between any two devices over any type of voice telephone network. The operations of FIG. 8 are not all-inclusive, and may include other operations not illustrated for the sake of brevity.

The process includes identifying multiple bits (M) of data for transmission from a client device to a remote device (operation 802). If the total data to be transmitted is greater in length than M bits, then the client device may divide the input data into multiple segments, each segment having a length of M bits. The length of bits M may be selected based on the minimum frequency separation required for transmission of data across a wireless telephone network. More particularly, the minimum frequency separation may be dictated by the length of a voice frame of the wireless telephone network. For example, if the voice frames are 20 ms in length, then the minimum frequency separation required $=2f_d=1/T_s=1/20ms=50$ Hz. Thus, in at least one embodiment, the number of bits (M) transmitted per frame may be 6. The number of bits (M) may be selected as 6 so that a total of 64 different frequencies may be utilized for transmitting data while fitting within the bandwidth of the wireless telephone network. By transmitting 6 bits/frame, a data rate of 6 bits/frame times 50 frames/s yields a data transfer rate of 300 b/s.

The process further includes selecting a frequency corresponding with a value of the data from a plurality of discrete frequency tones (operation 804). Each discrete frequency tone represents multiple bit (M) values of input data. For example, frequency $f_1$ may represent the bit value '000000', whereas frequency $f_{64}$ represents the bit value '111111'. In at least one embodiment, a frequency may be selected by matching the bit value with an index in a table and identifying the frequency corresponding with the matched index. In another embodiment, the frequency may be computed using an equation that utilizes the input data to determine the selected frequency.

The process further includes modulating an audio signal based on the selected frequency (operation 806). In other words, an audio signal is modulated at the selected frequency, the modulated audio signal representing a symbol. In at least one embodiment, a symbol may be transmitted during each voice frame of the wireless telephone network. For example, the audio signal may be modulated for 20 ms or less to match the length of the voice frame of the wireless telephone network.

The process further includes transmitting the audio signal from the client device to the remote device over a voice channel of a wireless telephone network (operation 808). For example, the client device may be communicatively coupled to a wireless base station of the telephone network through an integrated or external wireless telephone. In another embodiment, the client device is communicatively coupled to an analog landline of the telephone network and the remote device is communicatively coupled to the telephone network through a wireless base station of the telephone network. In some embodiments, the remote device and the client device maybe communicatively coupled through a voice over internet protocol (VOIP) telephone network.

Figure 9:
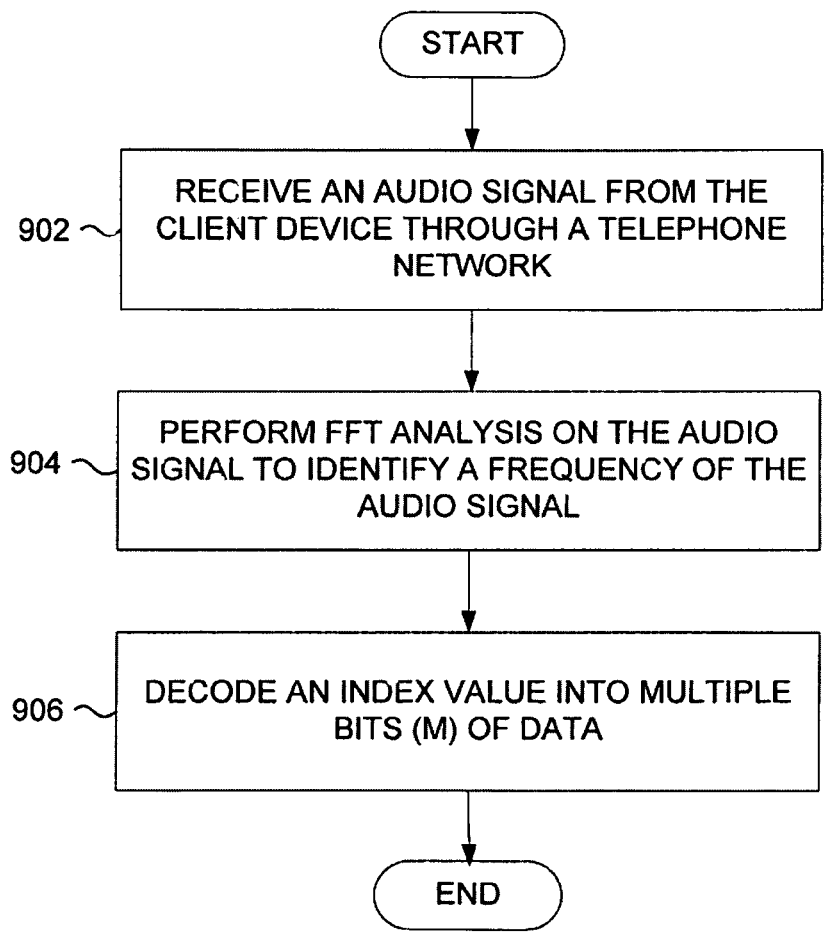
FIG. 9 illustrates an embodiment of a process for receiving data at a remote device that is M-ary frequency shift-key (FSK) encoded.

The remote device receives the audio signal from the telephone network, and demodulates the received audio signal to extract the data represented by the audio signal. FIG. 9 illustrates an embodiment of a process for receiving data at a remote device that is M-ary frequency shift-keying (FSK) encoded. The operations of FIG. 9 are not all-inclusive, and may include other operations not illustrated for the sake of brevity.

The process includes receiving an audio signal at the remote device from the client device over a voice channel of a telephone network (operation 902). The audio signal represents multiple bits (M) of data transmitted by the client device to the remote device. In at least one embodiment, the audio signal is at least partially transmitted over a wireless telephone network. For example, the client device may transmit the data to a wireless telephone communicatively coupled to a wireless telephone network, and the wireless telephone network may deliver the audio signal to a public switched telephone network (PSTN) communicatively coupled to the remote device.

The process further includes performing a frequency selection analysis on the audio signal to identify a frequency of the audio signal (operation 904). In at least one embodiment, the frequency selection analysis comprises a Fast Fourier Transform (FFT) analysis. In East Fourier Transform (FFT) analysis, a received signal is passed through a Fast Fourier Transform (FFT) with the same number of bins as the number of transmitted frequencies. For example, if the audio signal represents a value of data having a length of 6 bits, then the total number of possible frequencies utilized is 64. Therefore, 64 bins are utilized in the Fast Fourier Transform (FFT) analysis. The bin that corresponds with the maximum amplitude of the audio signal is selected as the transmitted frequency. The transmitted frequency corresponds with an index value of a bin utilized in the Fast Fourier Transform (FFT) analysis. It is to be appreciated that other types of demodulation algorithms may also be utilized in operation 904.

The process further includes decoding the index value into the multiple bits (M) of the data transmitted by the client device (operation 906). For example, if the transmitted frequency is $F_6$, which corresponds to an index value of 6, then the multiple bits (M) of data may be '000110'. In at least one embodiment, data transmitted by the client device may be gray coded (during operation 902) to reduce the bit error rate, and may be inverse gray coded in operation 906 to extract the original value of the transmitted data.

Although specific embodiments were described herein, the scope of the invention is not limited to those specific embodiments. The scope of the invention is defined by the following claims and any equivalents therein.

What is claimed:

1. A method for transmitting data from a client device to a remote device over a wireless telephone network, the method comprising:
    modulating data from a client device into an audio signal for transmission across a voice channel of a wireless telephone network, the data including diagnostic information regarding the client device and at least one other device separate from the client device;
    transmitting the audio signal from the client device to a wireless telephone; and
    transmitting the audio signal from the wireless telephone to a remote device over the wireless telephone network.

2. The method of claim 1, wherein modulating the data further comprises:
    modulating the data into an audio signal having characteristics of human speech.

3. The method of claim 2, wherein modulating the data into an audio signal further comprises:
    forming at least one packet from the audio signal, wherein a size of the at least one packet is selected to correspond with a size of a frame utilized by the wireless telephone network.

4. The method of claim 3, further comprising:
    receiving the at least one packet at the remote device;
    demodulating the audio signal of the at least one packet at the remote device to extract the data; and
    processing the extracted data.

5. The method of claim 4, wherein the data comprises ordering information, and wherein processing the extracted data further comprises:
    generating a bill for a user of the client device based on the ordering information.

6. The method of claim 1, wherein transmitting the audio signal from the client device to a wireless telephone further comprises:
    transmitting the audio signal from the client device to the wireless telephone over a wireless communication link.

7. The method of claim 1, wherein the at least one other device separate from the client device includes a display device.

8. The method of claim 1, wherein the at least one other device separate from the client device includes a satellite antenna device.

9. The method of claim 1, wherein the at least one other device separate from the client device includes a weather collection device.

10. A call processing system comprising: an interface module configured to receive a phone call, the phone call sent through a wireless telephone network from a wireless telephone coupled to a client device, the phone call including data modulated into an audio signal, the audio signal having characteristics of human speech and the data including diagnostic information regarding the client device and at least one other device separate from the client device, the diagnostic information related to an equipment failure; a decoder communicatively coupled to the interface module and configured to parse the audio signal to extract the data and configured to convert the data into a digital format; and a processor communicatively coupled to the decoder and configured to associate the digital format data with stored information regarding the client device.

11. The call processing system of claim 10, wherein:
    the client device comprises an entertainment device;
    the data includes video ordering information; and
    the processor is configured to generate a bill for a user of the client device based on the video ordering information.

12. The call processing system of claim 10, wherein the processor is configured to generate second data for transmission to the client device, and wherein the interface module is configured to:
    modulate the second data into a second audio signal, the second audio signal having characteristics of the human speech; and
    transmit the second audio signal to the wireless telephone over the wireless telephone network, wherein the wireless telephone is further configured to transmit the second audio signal to the client device.

\* \* \* \* \*